United States Patent Office 3,102,054
Patented Aug. 27, 1963

3,102,054
CEREAL STARCHES AND PROCESS
George C. Harris, Wilmington, Del., assignor to Hercules Powder Company, Wilmington, Del., a corporation of Delaware
No Drawing. Filed Dec. 27, 1960, Ser. No. 78,270
11 Claims. (Cl. 127—69)

The present invention relates to removing undesirable taste from cereal starches and the products resulting therefrom.

The term "taste" is used in the specification and claims hereof to mean taste, flavor, odor, either alone or in any combination.

Although this invention is applicable to any starch which contains an undesirable taste, it is especially applicable to wheat starch because it has a very decided undesirable ("cereal") taste and to corn starch because it is characterized by an odor which is quite objectionable for certain uses. This off-taste has precluded the use of wheat starch and corn starch, for example, in many food applications.

The taste-producing substances are present in the starch in both the adsorbed and the chemically bound forms. Apparently the prior art processes at best remove only the adsorbed portion because even in those cases in which the taste is removed it rapidly reappears.

Thus the main object of the present invention is cereal starches from which the off-taste has been permanently removed, and the process of removing said taste. This and other objects will be apparent from the description of this invention given hereinafter.

The above and other objects are accomplished according to the present invention by carrying out the process which comprises contacting cereal starch with an alcohol and aqueous ammonia, and separating the starch from the alcohol and aqueous ammonia.

The following examples illustrate specific embodiments of this invention, but they are not intended to limit the invention other than as defined in the claims of this application. In the examples and elsewhere herein the relative amounts of alcohol and aqueous ammonia to starch used are expressed as milliliters of alcohol and milliliters of aqueous ammonia per gram of starch. In these examples a somewhat different procedure was used depending on whether the starch was gelatinized or ungelatinized. When using ungelatinized starch (Examples 4–7), the starch was slurried in water with agitation, the methanol and aqueous ammonia were added to the slurry, the slurry was brought to the temperature desired and held at that temperature for the desired time, the agitation being continued throughout the process, the slurry was then filtered, the filter cake washed with fresh methanol-aqueous ammonia mixture and then with water. When using gelatinized starch (Examples 1–3), the starch was suspended in the methanol and then aqueous ammonia was added to this suspension; otherwise, the procedure was substantially the same as that just described for ungelatinized starch. In all cases the starches treated in accordance with these examples were free of cereal taste and remained so after aging for four days at 104° F. and 85% relative humidity. The amount of taste-producing material extracted from the starch fell within the range of 1.0–1.1% by weight of the starch.

The fact that the starches of the examples in Table 1 hereinbefore remained free of off-taste under the test con-

TABLE 1

| Example No. | Starch Type | Grams | Alcohol Type | Ml. | 28% NH₃ Ml. | Temp., °C. | Time, Hours |
|---|---|---|---|---|---|---|---|
| 1 | Gelatinized wheat | 100 | Anhydrous methanol | 300 | 100 | 25–30 | 16 |
| 2 | do | 100 | do | 400 | 50 | 65 | 2 |
| 3 | Gelatinized corn | 100 | do | 800 | 50 | 60 | 2 |
| 4 | Ungelatinized wheat | 100 | do | 300 | 50 | 65 | 6 |
| 5 | do | 100 | do | 400 | 50 | 60 | 2 |
| 6 | do | 100 | do | 800 | 50 | 65 | 2 |
| 7[2] | Ungelatinized corn | 430 | do | 1,500 | 250 | 65 | 6 |

[1] These were wet cakes, each containing about 100 grams of starch and 100 grams of water.
[2] 500 grams of water, added as such, was used in this example because the ungelatinized starch was substantially dry.

ditions employed means that, from the standpoint of taste, cereal starches treated in accordance with the present invention are quite adequate for any use, because these are highly accelerated conditions as compared with the normal storage conditions (that is, atmospheric storage conditions). In fact, subjecting the starches treated in accordance with this invention to these accelerated conditions is equivalent to storing these treated starches for several months at atmospheric conditions.

The following two examples were carried out to determine the effect of using an alcohol alone and using 28% aqueous ammonia alone.

Example 8
ALCOHOL ALONE

Examples 1–7 above were repeated except that the 28% aqueous ammonia and storage testing were omitted. All of the starches so treated contained a decided off-taste immediately after treatment, so there was no need to test them after storage.

Example 9
28% AQUEOUS AMMONIA ALONE

Examples 1–7 above were repeated except that the anhydrous methanol and storage testing were omitted. All of the starches so treated contained a decided off-taste immediately after treatment, so there was no need to test them after storage.

Instead of the 28% aqueous ammonia several other alkaline reagents were tried under substantially the same conditions of the above examples. In no case, however, was the off-taste removed. These other alkaline reagents included anhydrous ammonia, urea, sodium hydroxide, potassium hydroxide, and sodium carbonate.

Although I do not wish to be restricted to any theory regarding the possible mechanism of my invention, there is evidence that the off-taste in cereal starches may be due to the presence of lipids containing phosphorous or phosphatides, see, e.g., the article in American Chemical Society Monograph Series No. 112 (1951), entitled "The Phosphatides," written by H. Wittcoff. Apparently these lipids are associated in two different ways with all cereal starches, i.e., adsorbed on the starch and also chemically bound to the starch molecule. Thus a successful extraction process must accomplish two goals; first, it must completely dissolve and hydrolyze both the adsorbed and the chemically bound lipids, and secondly, it must solubilize the extracted (i.e., the dissolved and hydrolyzed) lipids in the solvent system. I am aware that the prior art shows solvent extraction processes using alcohols alone, using alcohols with acids or bases, and using alcohols with both acids and bases. However, these processes have not been successful and one explanation for this is based on the above theory. That is, those prior art processes using alcohols alone merely remove the adsorbed lipids so that the extracted starches are free of undesirable taste only momentarily and soon after treatment the chemically bound lipids become hydrolyzed and oxidized in part to cause the regeneration of the undesirable taste. In the other prior art processes failure to remove the undesirable taste may have been caused by the solvent system being inadequate to solubilize lipids so that they reprecipitated on the starch.

While from the standpoint of cost and availability methanol is the most practical solvent, I may use alcohols in general; provided, however, that they do not themselves contribute an undesirable taste to the starch. On this basis I prefer to use the lower aliphatic alchols, e.g. those of 1–4 carbon atoms. The following alcohols, e.g., when substituted for methanol give quite satisfactory results in accordance with this invention: ethyl, n-propyl, isopropyl, n-butyl, isobutyl, secondary butyl, and tertiary butyl.

I obtain very good results using from 3/1 to 8/1 ml. of methanol per gram of starch and using from 0.5/1 to 1/1 ml. of 28% aqueous ammonia per gram of starch. I obtain even somewhat better results using 4 ml. of methanol per gram of starch in combination with 0.5 ml. of 28% aqueous ammonia per gram of starch.

Although the present invention is applicable to starch either before or after gelatinization, the most practical stage at which to remove the objectionable taste is the wet-cake stage during processing prior to gelatinization. For instance, the wet cake treated in accordance with this invention in the above examples was the starch taken from the conventional separators, which separate flour into starch and gluten, and centrifuged to 50%–60% solids content prior to drying.

A considerable amount of deviation is permissible in the washing process described above in the examples. Alcohol alone may be used instead of the alcohol-aqueous ammonia mixture. For the ungelatinized starches, water alone can be used. For the gelatinized starches, up to about 10% water can be tolerated in the wash alcohol. In still another very practical way, the filtered, extracted wet cake is slurried in fresh water to the desired consistency and then dried directly.

As might be expected, time and temperature of the extracting treatment vary inversely. I have obtained good results varying from about room temperature (25° C.–30° C.) for 16 hours to 65° C. for 2 hours. Conditions outside this range could be used, but usually they would not be justified.

This invention is applicable to any starch which contains an undesirable taste, e.g., wheat starch, corn starch, rice starch, rye starch, barley starch, etc. Of these, this taste is perhaps more pronounced in wheat starch and corn starch.

As many apparent and widely different embodiments of this invention may be made without departing from the spirit and scope thereof, it is to be understood that the invention is not limited to the specific embodiments thereof except as defined in the appended claims.

What I claim and desired to protect by Letters Patent is:

1. Process of removing the undersirable taste from cereal starches so that it does not reappear which comprises contacting the starch with an alcohol and aqueous ammonia, and separating the starch from the alcohol and aqueous ammonia.

2. Process of claim 1 wherein the alcohol is a lower aliphatic alcohol.

3. Process of claim 1 wherein the alcohol is methanol and wherein the methanol/starch and ammonia/starch ratios are 3/1–8/1 and 0.5/1–1/1, respectively.

4. Process of claim 1 wherein the alcohol is methanol and wherein the methanol/starch and ammonia/starch ratios are 4/1 and 0.5/1, respectively.

5. Process of claim 1 wherein the starch is wheat starch.

6. Process of claim 1 wherein the starch is corn starch.

7. Process of removing the undersirable taste from gelatinized cereal starches so that it does not reappear which comprises contacting the starch with methanol and aqueous ammonia, separating the starch from the methanol and aqueous ammonia, and washing the starch with fresh methanol.

8. Process of removing the undersirable taste from ungelatinized cereal starches so that it does not reappear which comprises contacting the starch with methanol and aqueous ammonia and separating the starch from the methanol and aqueous ammonia and washing the starch with water.

9. In the process of separating cereal flour into starch and gluten by washing with water wherein the starch fraction is partially dewatered prior to drying, the improvement which comprises contacting the partially dewatered starch with an alcohol and aqueous ammonia, and separating the starch from the alcohol and aqueous ammonia.

10. Process of removing the undesirable taste from an ungelatinized cereal starch so that it does not reappear which comprises contacting the starch with methanol and aqueous ammonia, filtering, reslurrying the filtered starch in fresh water and drying.

11. Process of claim 10 wherein the methanol/starch and the ammonia/starch ratios are 3/1–8/1 and 0.5/1–1/1, respectively.

References Cited in the file of this patent

UNITED STATES PATENTS

| | | |
|---|---|---|
| 2,222,875 | Leuck | Nov. 26, 1940 |
| 2,280,723 | Schoch | Apr. 21, 1942 |
| 2,587,650 | Rist et al. | Mar. 4, 1952 |

OTHER REFERENCES

Kerr: Chemistry and Industry of Starch, 2nd Ed., 1950, Academic Press, Inc., New York, N.Y., pp. 63–66.

Radley: Starch and Its Derivatives, vol. II, p. 339, 1954, 3rd Ed., Wiley & Sons, New York, N.Y.